(12) United States Patent
Tarakji et al.

(10) Patent No.: US 10,796,105 B2
(45) Date of Patent: Oct. 6, 2020

(54) DEVICE AND METHOD FOR CONVERTING DIALECT INTO STANDARD LANGUAGE

(71) Applicant: Samsung Electronics Co., Ltd., Suwon-si, Gyeonggi-do (KR)

(72) Inventors: Ahmad Bisher Tarakji, Mountain View, CA (US); Anas Toma, Amman (JO); Wael Farhan, Amman (JO)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/940,361

(22) Filed: Mar. 29, 2018

(65) Prior Publication Data

US 2018/0293228 A1    Oct. 11, 2018

(30) Foreign Application Priority Data

Apr. 11, 2017   (KR) .................. 10-2017-0046930

(51) Int. Cl.
| | |
|---|---|
| *G06F 40/58* | (2020.01) |
| *G06F 40/44* | (2020.01) |
| *G06F 40/157* | (2020.01) |
| *G06F 40/263* | (2020.01) |
| *G06F 40/284* | (2020.01) |
| *G06F 40/295* | (2020.01) |

(52) U.S. Cl.
CPC ............ *G06F 40/58* (2020.01); *G06F 40/157* (2020.01); *G06F 40/263* (2020.01); *G06F 40/284* (2020.01); *G06F 40/295* (2020.01); *G06F 40/44* (2020.01)

(58) Field of Classification Search
None
See application file for complete search history.

(56) References Cited

U.S. PATENT DOCUMENTS

| | | | |
|---|---|---|---|
| 8,204,182 | B2 | 6/2012 | Da Palma et al. |
| 2005/0044495 | A1* | 2/2005 | Lee .................. G06F 17/2223 715/257 |
| 2008/0177528 | A1 | 7/2008 | Drewes |
| 2010/0179803 | A1 | 7/2010 | Sawaf et al. |
| 2011/0184718 | A1* | 7/2011 | Chen .................. G06F 40/253 704/2 |
| 2012/0035915 | A1* | 2/2012 | Kitade ................ G10L 15/197 704/9 |
| 2013/0173247 | A1* | 7/2013 | Hodson ................ G06F 17/28 704/4 |
| 2016/0336008 | A1* | 11/2016 | Menezes ............. G10L 15/187 |
| 2017/0193986 | A1* | 7/2017 | Chen .................. B60R 16/0373 |
| 2017/0309272 | A1* | 10/2017 | Vanreusel ............ G10L 15/07 |
| 2019/0034407 | A1* | 1/2019 | Hagiwara ........... G06F 17/289 |

\* cited by examiner

*Primary Examiner* — Antim G Shah

(57) ABSTRACT

A method and a device for converting a dialect of a predetermined language into a standard language include obtaining a sentence including a dialect word, identifying at least one common word that is used identically in the dialect and the standard language in the sentence including the dialect word, replacing the identified at least one common word with a predetermined keyword, obtaining one or more vector values corresponding to the predetermined keyword and each of remaining words included in the sentence, and obtaining a standard language sentence based on an arrangement of the obtained one or more vector values.

13 Claims, 7 Drawing Sheets

DEVICE AND METHOD FOR CONVERTING DIALECT INTO STANDARD LANGUAGE

CROSS-REFERENCE TO RELATED APPLICATIONS AND CLAIM OF PRIORITY

This application is based on and claims priority under 35 U.S.C. § 119 to Korean Patent Application No. 10-2017-0046930, filed on Apr. 11, 2017, in the Korean Intellectual Property Office, the disclosure of which is incorporated by reference herein in its entirety.

TECHNICAL FIELD

The present disclosure relates to a device and method for converting a dialect into a standard language.

BACKGROUND

Deep machine learning is a technique that automatically extracts key features from a large amount of data by using an artificial neural network created by simulating a human brain and performs various tasks such as recognition, generation, and inference based on extracted features.

In particular, in recent years, deep machine learning is used for translation, and specifically, neural machine translation (NMT) is being developed and advanced. NMT is a translation method that takes into account an entire sentence, unlike conventional statistical machine translation (SMT) which mainly translates phrase units. A computer repeatedly learns the optimal result among translation results of a sentence to be translated to allow natural translation to be performed.

Also, recently, translation between two different languages is required as well as translation between dialects and standard languages. However, conventional translation tools treat languages to be translated as two completely different languages with different vocabularies, different word models, different grammatical rules, different word order, etc. However, in the case of translation of dialects and standard languages, a method of improving a translation process by using similarity between dialects and standardized languages is required for efficient translation.

SUMMARY

Certain embodiments according to this disclosure provide device and methods for converting a dialect into a standard language. The technical problem to be solved by some embodiments of the present disclosure is not limited to the above-described technical problems, and other technical problems may be deduced from the following embodiments.

Additional aspects will be set forth in part in the description which follows and, in part, will be apparent from the description, or may be learned by practice of the presented embodiments.

In accordance with certain embodiments of this disclosure, a method of converting a dialect of a predetermined language into a standard language includes obtaining a sentence including a dialect word; identifying at least one common word that is used identically in the dialect and the standard language in the sentence including the dialect word; replacing the identified at least one common word with a predetermined keyword; obtaining one or more vector values corresponding to the predetermined keyword and each of remaining words included in the sentence; and obtaining a standard language sentence based on an arrangement of the obtained one or more vector values.

In accordance with some embodiments of this disclosure, a computer-readable recording medium having recorded thereon one or more programs including instructions for executing the method is provided.

According to various embodiments of this the disclosure, a device includes a memory in which at least one program is stored; and a processor configured to convert a dialect of a predetermined language into a standard language by executing the at least one program, wherein the at least one program includes obtaining a sentence including a dialect word; identifying at least one common word that is used identically in the dialect and the standard language in the sentence including the dialect word; replacing the identified at least one common word with a predetermined keyword; obtaining one or more vector values corresponding to the predetermined keyword and each of remaining words included in the sentence; and obtaining a standard language sentence based on an arrangement of the obtained one or more vector values.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
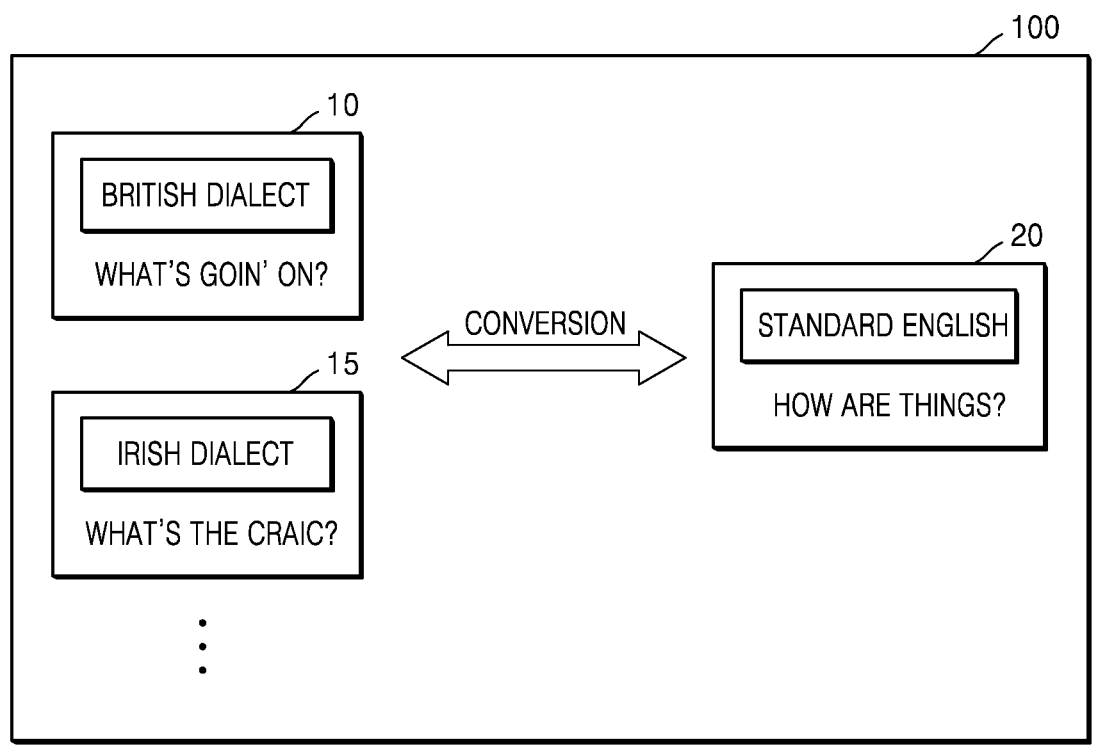
FIG. 1 illustrates aspects of a system that converts a dialect of a predetermined language into a standard language, according to certain embodiments of this disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments will now be described in detail with reference to the accompanying drawings below. It shall be understood that the following description is intended to embody the embodiments and not to limit or restrict the scope of the invention. It shall be construed that those of ordinary skill in the art may readily conceive from the detailed description and the embodiments belongs to the scope of the invention.

As used herein, the terms 'comprises' or 'comprising' and the like should not be construed as necessarily including various components or operations described in the specification, may include some of the components or some of the operations, or may be interpreted to include additional components or operations.

Also, as used herein, terms including ordinals such as 'first' or 'second' may be used to describe various components, but the components should not be limited by the terms. The terms are used only for the purpose of distinguishing one component from another.

Certain embodiments according to this disclosure are directed to a method and device for converting a dialect into a standard language, and a detailed description thereof will be omitted with respect to matters widely known to those of ordinary skill in the art to which the following embodiments belong.

In the embodiments described in the present disclosure, the term 'standard language' encompasses an exemplary, or standard variant of a spoken or written language (for example, British English or "Hochdeutsch" German), and the term 'dialect' is a variant in which a language, which was originally homogeneous, varies geographically or socially and may refer to a system of voices, phonemes, grammar, and vocabulary used only in a specific area or social class (for example, Cockney English or "Schweizerdeutsch" German). For example, the 'dialect' may be a variety of a language that is used in a particular language group and has a distinctive feature from a language system of another language group.

In embodiments described in the present disclosure, the term 'dialect sentence' encompasses a sentence including at least one dialect word, and the term 'standard language sentence' may mean a sentence including only standard language words.

Also, in the embodiments disclosed in this disclosure, the term 'common word' encompasses a word that is used similarly in dialects and standard languages. For example, proper nouns including names of persons, names of places, and names of organizations may be common words. Also, words for an organization, date, time, number, and the like may be common words.

According to certain embodiments as disclosed herein, information of each of a plurality of words included in a 'vector value' sentence is represented by an n-dimensional (n is an arbitrary natural number) real number vector. For example, the 'vector value' may refer to a value that is classified based on a length of a word, a part of speech of the word, a category of the word, context, a word order, etc. Also, the information of each of the plurality of words may include not only information about a corresponding word but also information about synonyms, antonyms of the corresponding word, a corresponding standard language word, and/or a corresponding dialect word, and the 'vector value' may be determined or obtained.

In various embodiments of the present disclosure, the term 'translation mapping table' encompasses data that stores various types of information about words such as pronunciation of a dialect word and a standard language word, meaning, relationship with other words, etc. For example, a 'translation mapping table' may include information such as words, phrases, a word order, etc. included in standard language sentences and dialect sentences and context information. Also, the 'translation mapping table' may include not only information about a corresponding word but also information about synonyms and antonyms of the corresponding word, a corresponding standard language word, and/or a corresponding dialect word.

According to certain embodiments as disclosed herein, the term 'dialect detector' may encompass a functional block structure that detects a dialect of a sentence including a dialect word. For example, the 'dialect detector' may identify at least one dialect word of words included in the sentence including the dialect word, and determine a type of a dialect based on the identified at least one dialect word.

According to certain embodiments described herein, the term 'sequence-to-sequence conversion' encompasses a translation method that takes into account the entire sentence in a translation system that uses an artificial neural network, and may refer to a translation method which uses mapping between various lengths of sentences instead of using one-to-one lookups between words. Also, the term 'sequence-to-sequence converter' as used herein, encompasses a functional block configuration that performs 'sequence-to-sequence conversion'.

In certain embodiments disclosed in the present disclosure, the term 'named entity recognition (NER)' encompasses a functional block configuration that identifies at least one common word that is used identically in dialects and standard languages in a sentence, and replaces the identified common word with a predetermined keyword. For example, when a sentence 'John is going to Samsung at 8:00 AM.' is entered, the 'NER' may identify 'John', 'Samsung', and '8:00 AM' as common words and replace them with 'PER', 'ORG', and 'TIME', respectively. On the other hand, in the embodiments disclosed in the present disclosure, the term 'NER replacement' may mean a process of converting a predetermined keyword included in a converted sentence into a common word again.

FIG. 1 illustrates a system 100 which converts a dialect of a predetermined language into a standard language according to some embodiments of the present disclosure.

Referring to the nonlimiting example of FIG. 1, the system 100 that converts the dialect of the predetermined language into the standard language according to some embodiments is illustrated. For the purposes of this disclosure, converting a dialect into a standard language encompasses translating the dialect into the standard language. The predetermined language may include one standard language and a plurality of dialects.

In the non-limiting example of FIG. 1, a dialect sentence includes a change of at least one of a word, an order of words, a length of a sentence, a prefix, and a suffix in comparison with a standard language sentence. Therefore, in order for a user who may not speak a dialect to understand a sentence including a dialect word, the system 100 that converts the dialect into the standard language may be helpful.

According to some embodiments, the system 100 may receive an input of a dialect sentence and convert the input dialect sentence into a standard language sentence. For example, as shown in FIG. 1, the system 100 may receive a British dialect sentence 10 "What's goin' on?" or an Irish dialect sentence 15 "What's the craic?", and convert received dialect sentence 10 or 15 into a standard language sentence 20 "How are things?"

Also, the system 100 may receive the standard language sentence 20 and convert the received standard language sentence 20 into the dialect sentence 10 or 15. For example, as illustrated in FIG. 1, the system 100 may receive standard language sentence 20 "How are things?" and convert the standard language sentence 20 into the British dialect sentence 10 "What's goin' on?" or the Irish dialect sentence 15 "What's the craic?".

While there are differences between dialects and standard languages, there may also be similarities. Since dialects and standard languages use the same alphabet, there may be common words used in dialects and standard languages analogously. For example, proper names, including names of persons, names of places and names of organizations, may be used analogously in dialects and standard languages.

The system 100 according to some embodiments may improve a translation process by using a similarity of a dialect and a standard language when translating the dialect and the standard language of a predetermined language, unlike the case of translating two different languages. For example, the system 100 may omit unnecessary translations for common words that are used identically in the dialect and the standard language. Also, the system 100 may increase accuracy of translation by utilizing common words to translate other words.

On the other hand, the system 100 according to some embodiments may be a device. The device may be implemented as various devices such as a smart phone, a tablet PC, a laptop computer, a wearable device, a desktop, an electronic book terminal, a digital broadcast terminal, a personal digital assistant (PDA), a portable multimedia player (PMP), a navigation device, an MP3 player, and the like, or a server but is not limited thereto.

The system 100 may also be implemented as a combination of a device and a server. A device receiving an input of a user and a translation server exist separately so that translation may be performed through communication between the device and the translation server. Translation may be performed in a single device, and is not limited to the above example.

Hereinafter, for convenience of description, a method of converting a dialect performed in a "device" into a standard language will be described. However, some or all of operations of the device described below may also be performed in a server, and may be performed partially by a plurality of devices.

Figure 2:
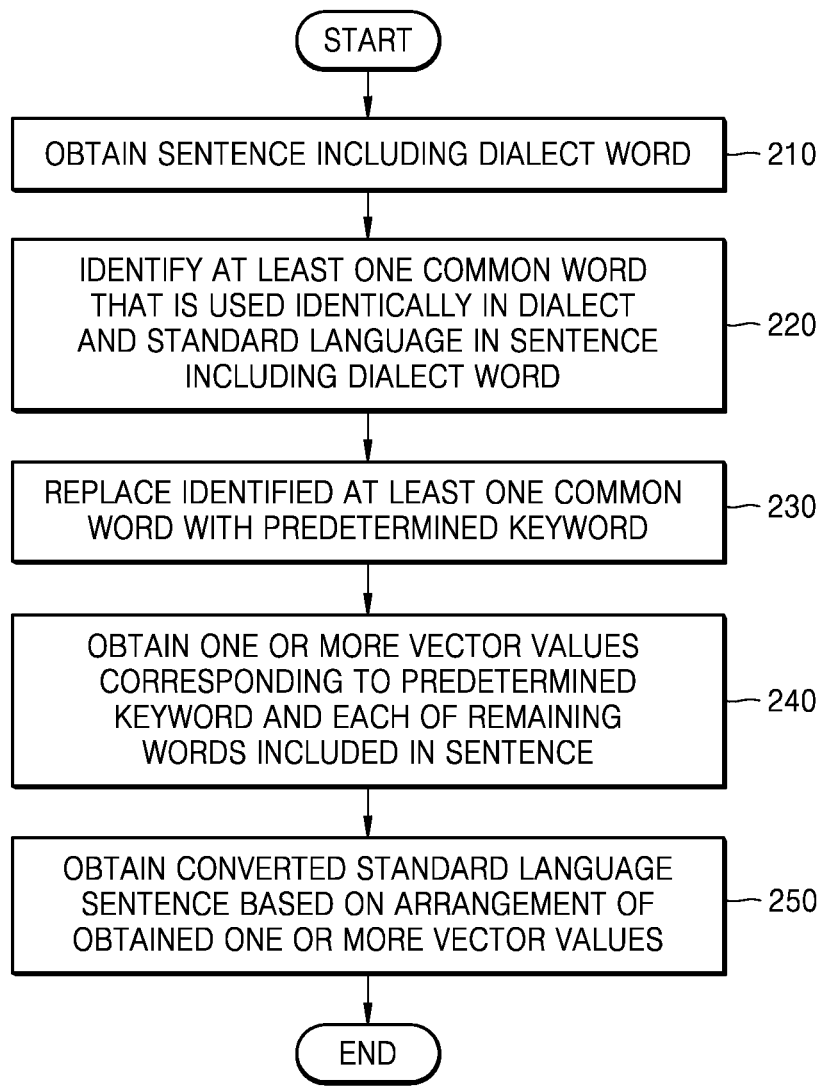
FIG. 2 illustrations of a method of translating a dialect of a predetermined language into a standard language, according to various embodiments.

FIG. 2 illustrates operations of a method of translating a dialect of a predetermined language into a standard language according to some embodiments of the present disclosure.

Referring to the non-limiting example of FIG. 2, in operation 210, a device may obtain a sentence including a dialect word. The device may obtain the sentence including the dialect word in order to convert the sentence including the dialect word into a standard language sentence.

In some embodiments, the sentence including the dialect word may include a change of at least one of a word, an order of words, a length of a sentence, a prefix, and a suffix in comparison with the standard language sentence. For example, when "Are you excited?" is an English standard language sentence, a corresponding British dialect sentence may be "Are you knees up?" and a corresponding Irish dialect sentence may be "Are you delira and excira about it?"

The device may receive the sentence including the dialect word from outside. Also, the device may extract the sentence including the dialect word from text included in data stored in the device or generated by the device.

In the non-limiting example of FIG. 2, the device may detect a dialect of the sentence including the dialect word. For example, the device may receive the sentence and identify at least one dialect word among words included in the received sentence. The device may also determine a type of the dialect based on the identified at least one dialect word. The device may also determine the type of the dialect based on an arrangement of the dialect words.

The device may determine a type of a most probable dialect among a plurality of dialects of a predetermined language based on an arrangement of characters constituting the dialect word. The device may calculate a probability that the dialect word corresponds to each of the plurality of dialects, and determine a dialect having a highest probability as the type of the dialect corresponding to the dialect word.

In some embodiments, the device may use document classification that is a well-known technique in machine learning, to determine the most probable dialect. Language models with respect to each of the plurality of dialects may be constructed. The device may determine the type of the dialect based on the identified at least one dialect word and use a language model corresponding to the type of the dialect.

Further, the device may divide the sentence including the dialect word into one or more words. The device may perform subsequent operations based on the divided one or more words. On the other hand, the device may divide the sentence including the dialect word into morpheme units. The sentence dividing operation may be performed any time before the device performs operation 240. For example, the sentence dividing operation may be performed in operation 220 or operation 230.

In the non-limiting example of FIG. 2, at operation 220, the device may identify at least one common word that is used identically in a dialect and a standard language in the sentence including the dialect word. In some embodiments, common words may include proper nouns including names, names of places, and names of organizations. For example, since the proper name "John" is used identically in the standard language and the dialect, the device may identify "John" as a common word when "John" is included in the sentence. Also, common words may include other words, such as organization, date, time, number, etc., that are used identically in the dialect and the standard language.

The device may identify the at least one common word in the sentence including the dialect word and determine a type of the identified at least one common word. For example, if the device identifies "John" as a common word, the device may determine that the common word "John" corresponds to a proper noun. The device may determine whether the identified common word corresponds to a proper noun, an organization, a date, a time, or a number.

In the non-limiting example of FIG. 2, at operation 230, the device may replace the identified at least one common word with a predetermined keyword. For example, the device may replace all proper nouns with a keyword "PER". PER is a keyword indicating a person. A proper noun may, in some embodiments, be replaced with "PER".

More specifically, when a sentence "John is walking with David." is input, the device may identify "John" and "David" as common words (proper nouns), and replace the identified words "John" and "David" with the predetermined keyword "PER". As a result, the sentence may be replaced with "PER is working with PER."

Also, the device may replace all organizations with "ORG", all numbers with "NUM", and all dates with "DATE". For example, when a sentence "John is going to Samsung at 8:00 AM." is input, the device may replace "John", "Samsung" and "8:00 AM" with "PER", "ORG", and "TIME" respectively. As a result, the sentence may be replaced with "PER is going to ORG at TIME." Predetermined keywords such as "PER", "TIME", "DATE", and "ORG" are merely examples and embodiments according to the present disclosure are not limited thereto.

On the other hand, the device may store information mapping the predetermined keyword, the at least one common word, and a position of the at least one common word in the sentence including the dialect word. For example, the device may store information mapping "PER", "John", and "position 1" when replacing "John is walking now." with "PER is working now." "PER" may mean the predetermined keyword corresponding to a type of the common word. "John" may mean the common word. "position 1" may mean that the common word is located first in the sentence. The positional information of the common word may be identified and stored in units of word phrases, and is not limited to the above example.

According to various embodiments, at operation 240, the device may obtain one or more vector values corresponding to the predetermined keyword and each of remaining words included in the sentence.

In some embodiments, the device may translate a dialect into a standard language by using machine translation using an artificial neural network. For example, various artificial neural network models such as DNN (Deep Neural Network), RNN (Recurrent Neural Network) and BRDNN (Bidirectional Recurrent Deep Neural Network) may be used as a translation model, but the present disclosure is not limited thereto.

According to certain embodiments, the artificial neural network is an algorithm that receives a vector value as an input and outputs a vector value, and the device may obtain the one or more vector values corresponding to the predetermined keyword and each of the remaining words included in the sentence in order to convert the standard language into the dialect by using the artificial neural network.

A vector corresponding to a particular word may be a word embedding vector. The word embedding vector may be a vector corresponding to a specific location on a hyper dimensional space so as to include various types of information about the word. For example, each of words included in a sentence may be represented by a corresponding 200-dimensional real vector value. The number 200 is only an example and selected solely for illustrative purposes. The vector value may have any number of dimensions sufficient to include various types of information about the words included in the sentence. A value of each of dimensions that the words have may be determined according to each piece of information that the words have.

According to certain embodiments, the device may obtain a predetermined vector value with respect to the predetermined keyword and obtain vector values corresponding to the remaining words based on the predetermined vector value. For example, the device may obtain predetermined vector values with respect to the predetermined keywords such as "PER", "TIME", "DATE", and "ORG". The predetermined keyword may be a part of context that affects vector values corresponding to remaining words included in the same sentence. Accordingly, the device may first obtain the vector value corresponding to the predetermined keyword, and then obtain the vector values corresponding to the remaining words based on the vector value corresponding to the predetermined keyword. The predetermined vector value may be determined by the device and may be determined by a user input.

Also, the device may, in certain embodiments, determine whether the predetermined keyword and the remaining words included in the sentence are included in a translation mapping table, and when the predetermined keyword and a first word among the remaining words included in the sentence are included in the translation mapping table, may obtain a vector value corresponding to the first word from the translation mapping table.

In some embodiments, the translation mapping table may be a bi-directional lexicon. Lexicon stores information about a word such as a pronunciation of the word, a meaning, etc.

Various types of information about dialect words and standard language words may be stored in the form of vector values to facilitate processing by the device. Accordingly, the translation mapping table may include information about a vector value corresponding to each of the standard language words and the dialect words. The translation mapping table may also store information for mapping a dialect word to a standard language words corresponding to the corresponding dialect word based on various types of information about the dialect words and the standard language words.

On the other hand, the translation mapping table may be generated by the device. In some embodiments, the device may obtain a set of the standard language words and a set of the dialect words. The device may extract common words used in the standard language and the dialect from the set of the standard language words and the set of the dialect words and assign a first vector value to the extracted common words.

The device may, in some embodiments, assign second vector values corresponding to each of the words included in the set of the standard language words based on the assigned first vector value and an arrangement of characters constituting each of the words included in the set of the standard language words. The device may also assign third vector values corresponding to the words included in the set of the dialect words based on the assigned first vector value and an arrangement of characters constituting each of the words included in the set of the dialect words.

For example, vector values corresponding to words included in a standard language sentence "Do you want go to PER?" are already stored in the translation mapping table and the device assigns vector values of words included in a dialect sentence "Wanna go PER? " Since vector values are already assigned to "go" and "PER", vector values corresponding to "Wanna" may be derived based on the vector values assigned to common words "go" and "PER". The common words and keywords corresponding to the common words may be utilized as a baseline for training a dialect vocabulary. Standard language words and dialect words may be projected in the same hyper-dimensional space based on vector values corresponding to common words.

Meanwhile, the device may generate the translation mapping table by matching the second vector values and the third vector values. The device may continue to train and update the generated translation mapping table. For example, the device may obtain a set of new standard language words and a set of dialect words, and repeat the process described above. The translation mapping table may learn new information based on previously stored information. Since the common words need not be trained separately in the translation mapping table, an unnecessary training process may be reduced.

In the foregoing description, embodiments where the device generates the translation mapping table have been described. In other embodiments, a server or another device may generate the translation mapping table, and the device may receive or use the translation mapping table generated by the server or the other device.

According to certain embodiments, if the predetermined keyword and a second word among the remaining words included in the sentence are not included in the translation mapping table, the device may predict a vector value corresponding to the second word based on an arrangement of characters constituting the second. If the device does not obtain the vector value corresponding to the word from the translation mapping table, the device may predict the vector value corresponding to the word.

By way of non-limiting example, the device may obtain the vector value corresponding to the word by using an n-gram scheme, which is a representative probabilistic language models. The n-gram may refer to a continuous arrangement of n items in a predetermined sentence. The items may be phonemes, syllables, letters, words, and so on. The n-gram scheme may be a probabilistic language model for predicting an n-th item based on an arrangement of n−1 items. The device may predict the vector value corresponding to the word based on vector values corresponding to words having an arrangement of characters constituting a word not included in the translation mapping table and an arrangement of characters similar to the word.

The device may, in some embodiments, probabilistically represent a chain of n words, thereby assuming information about the word not stored in the translation mapping table. The device may also use a hidden Markov model for language modeling (HMM-LM).

In the non-limiting example of FIG. 2, at operation 250, the device may obtain a standard language sentence based on an arrangement of the obtained one or more vector values. The device may use sequence-to-sequence conversion to convert an arrangement of vector values representing the dialect sentence into an arrangement of vector values representing the corresponding standard language sentence. For example, the device may perform sequence-to-sequence conversion by using a long short-term memory (LSTM) algorithm.

The device may obtain the standard language sentence based on the arrangement of the vector values representing the standard language sentence obtained by sequence-to-sequence conversion. Since the predetermined keyword corresponding to the common words is used in the standard language and the dialect, the predetermined keyword may be included in the obtained standard language sentence. Therefore, in order for the device to obtain a complete standard language sentence, a process of converting the predetermined keyword back into the common words is advantageous.

The device may, according to certain embodiments, obtain one or more vector values corresponding to the predetermined keyword and each of the remaining words included in the sentence and obtain a converted sentence including standard language words corresponding to the remaining words and the predetermined keyword based on an arrangement of the obtained one or more vector values. Further, the device may convert the predetermined keyword included in the converted sentence into at least one common word, thereby obtaining the standard language sentence.

In a process of converting the predetermined keyword included in the converted sentence into the at least one common word performed by the device, the information mapping the predetermined keyword, the at least one common word, and the position of the at least one common word in the sentence including the dialect word stored in operation 230 may be used. For example, when common words "John" and "Jackie" are replaced by the predetermined keyword "PER" in a dialect sentence "Gonna go to school with John and Jackie", mapping information such as "PER, John, position 6" and "PER, Jackie, position 8" may be stored in operation 230.

As a further example, in some embodiments, when the sentence "Gonna go to school with PER and PER." is converted into "I am going to school with PER and PER." by sequence-to-sequence conversion (conversion from a dialect to a standard language), it may be necessary to determine which "PER" is "John" or "Jackie" among "PER"s included in the converted sentence. At this time, the device may determine most probable positions of the common words "John" and "Jackie" by using mapping information such as "PER, John, position 6" and "PER, Jackie, position 8".

For example, the device may use a cost function to determine a combination of positions having the lowest cost among combinations of possible positions as a combination of positions of common words. In the preceding example, a final standard language sentence may be "I am going to school with John and Jackie." or "I am going to school with Jackie and John."

If the final standard language sentence is "I am going to school with John and Jackie.", since a position of John is position 7, and a position of Jackie is position 9, the cost may be calculated as $|7-6|+|9-8|=2$ by the cost function. On the other hand, if the final standard language sentence is "I am going to school with Jackie and John.", since the position of John is position 9 and the position of Jackie is position 7, the cost may be calculated as $|9-6|+|7-8|=4$ by the cost function. Therefore, the device may determine the sentence "I am going to school with John and Jackie." having positions of words minimizing the cost function as the final standard language sentence.

The operations of methods according to this disclosure have heretofore been illustrated through examples involving converting a dialect of a predetermined language into a standard language has been described with reference to FIG. 2. According to certain embodiments the method of converting the dialect of the predetermined language into the standard language of FIG. 2 may be equally applied to a method of converting a standard language of a predetermined language into a dialect.

Figure 3:
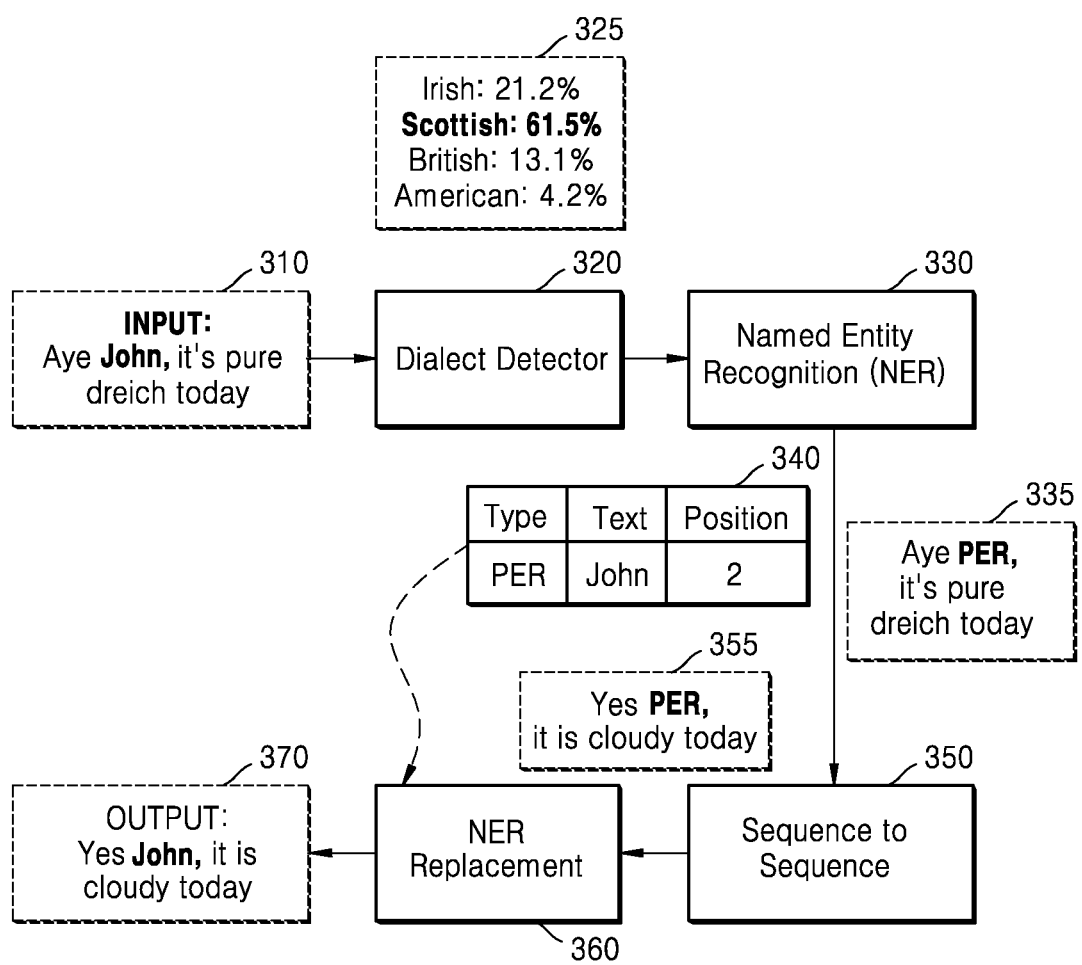
FIG. 3 illustrates aspects of a process of converting a dialect of a predetermined language into a standard language, according to certain embodiments of this disclosure.

FIG. 3 illustrates operations of a process of converting a dialect of a predetermined language into a standard language according to some embodiments of the present disclosure.

Referring to the non-limiting example of FIG. 3, a device may obtain a sentence 310 including a dialect word "Aye John, it's pure dreich today." in order to convert the sentence 310 including the dialect word into a standard language sentence 370.

The device may detect a dialect of the sentence 310 including the dialect word by using a dialect detector 320. The device may identify at least one dialect word among words included in the sentence 310 including the dialect word and determine a type of the dialect based on the identified at least one dialect word.

The device may, in certain embodiments, determine a type of the most probable dialect among a plurality of dialects of a predetermined language based on an arrangement of characters constituting the dialect word. The device may calculate a probability that the dialect word corresponds to each of the plurality of dialects, and determine a dialect having the highest probability as the type of the dialect corresponding to the dialect word.

For example, as shown in FIG. 3, the device may obtain a result 325 that a probability that the sentence 310 including the dialect word is the Irish dialect is 21.6%, a probability that the sentence 310 including the dialect word is the Scottish dialect is 61.5%, and a probability that the sentence 310 including the dialect word is the Irish dialect is 13.1%. The device may determine the type of dialect as the Scottish dialect, which is the dialect with the highest probability based on the result 325.

In the non-limiting example of FIG. 3, once the type of the dialect is determined, the device may identify at least one common word that is used identically in the dialect and the standard language in the sentence 310 including the dialect word by using a named entity recognizer 330. In some embodiments, common words may include proper nouns including names, names of places, and names of organizations. A proper noun "John" is identically used in the standard language and the dialect, and thus the device may identify "John" as a common word.

The device may replace the identified common word "John" with the predetermined keyword "PER". As a result, the device may obtain a sentence 335 "Aye PER, it's pure dreich today." The device may omit unnecessary translation for common words by replacing the common words used in the dialect and the standard language with predetermined keywords.

On the other hand, when the device replaces the common word "John" with the predetermined keyword "PER", the device may store mapping information 340 mapping the predetermined keyword "PER", the common word "John", and "position 2" that is a position of the common word in the sentence 310 including the dialect word. "PER" may mean the predetermined keyword corresponding to a type of the common word. "John" may mean the common word. "position 2" indicates that the common word is positioned second in the sentence 310.

In some embodiments, the device converts a sentence 335 to a sentence 355 "Yes PER, it is cloudy today" by using a sequence-to-sequence converter 350. In this non-limiting example, converted sentence 355 is a sentence including standard language words corresponding to dialect words included in the sentence 310 including the dialect word and the predetermined keyword "PER".

The device may obtain a standard language sentence 370 "Yes John, it is cloudy today." By converting the predetermined keyword "PER" included in the converted sentence 355 into the common word "John" back through an NER replacement 360. In a process of converting the predetermined keyword "PER" included in the converted sentence 355 into the common word "John" back, the mapping information 340 stored in a previous operation may be used.

The aforementioned dialect detector 320, the named entity recognizer 330, and the sequence-to-sequence converter 350 may be functional block configurations included in the device. Some or all of these functional blocks may be implemented as various numbers of hardware and/or software configurations that perform particular functions. For example, the functional blocks of the present disclosure may be implemented by one or more microprocessors, or by circuit configurations for a predetermined function. Also, for example, the functional blocks of the present disclosure may be implemented in various programming or scripting languages. The functional blocks may be implemented in algorithms running in the one or more processors.

Figure 4:
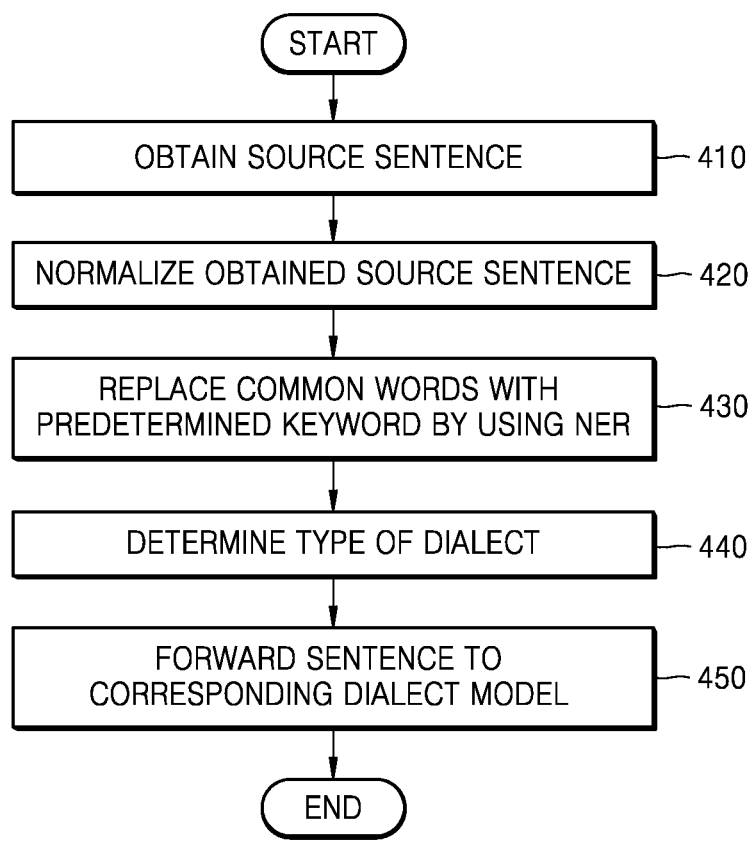
FIG. 4 illustrates operations of a method of preprocessing a source sentence, according to some embodiments of this disclosure.

FIG. 4 illustrates operations of a method of preprocessing a source sentence according to some embodiments.

Referring to the non-limiting example of FIG. 4, in operation 410, a device may obtain a source sentence. The source sentence is a sentence to be translated, which may be a sentence to be input in a translation process. For example, in a process of converting a dialect of a predetermined language into a standard language, the source sentence may be a dialect sentence. The source sentence is distinguished from a target sentence, which is a sentence that is a target of translation. In the preceding example, the target sentence may be a standard language sentence.

According to certain embodiments, at operation 420, the device may text normalize the obtained source sentence. Normalization encompasses converting text included in the source sentence into a single canonical form. For example, the device may normalize "don't" included in the source statement and convert the normalized "don't" into "do not". The device may prepare to train a translation mapping table the source sentence or perform sequence-to-sequence conversion by normalizing the source sentence.

According to certain embodiments, at operation 430, the device may replace common words with a predetermined keyword by using a named entity recognizer (NER). As described above, the NER may be a functional block configuration that identifies a common word that is used analogously in dialects and standard languages in a sentence, and replace the identified common word with a predetermined keyword.

In some embodiments, the device may identify at least one common word that is used identically in dialects and standard language in the source sentence and replace the identified at least one common word with the predetermined keyword. Operation 430 of FIG. 4 may, in certain embodiments, be functionally analogous to operations 220 and 230 of FIG. 2, and thus a redundant description thereof is omitted.

In operation 440, the device may determine a type of a dialect. The device may identify at least one dialect among words included in the source sentence and determine the type of the dialect based on the identified at least one dialect word.

According to some embodiments, the device determines a type of the most probable dialect among a plurality of dialects of a predetermined language based on an arrangement of characters constituting a dialect word. The device may calculate a probability that the dialect word corresponds to each of the plurality of dialects, and determine a dialect having the highest probability as the type of the dialect corresponding to the dialect word.

In some embodiments, at operation 450, the device forwards the sentence to a corresponding dialect model. Language models for each of a plurality of dialects may be constructed. The device may forward the sentence to the dialect model corresponding to the type of the dialect determined in operation 440.

The device may perform preprocessing on the source sentence by performing the preceding operations. The device may prepare to train the translation mapping table the source sentence or perform sequence-to-sequence conversion (standard language-dialect conversion) by preprocessing the source sentence.

Figure 5:
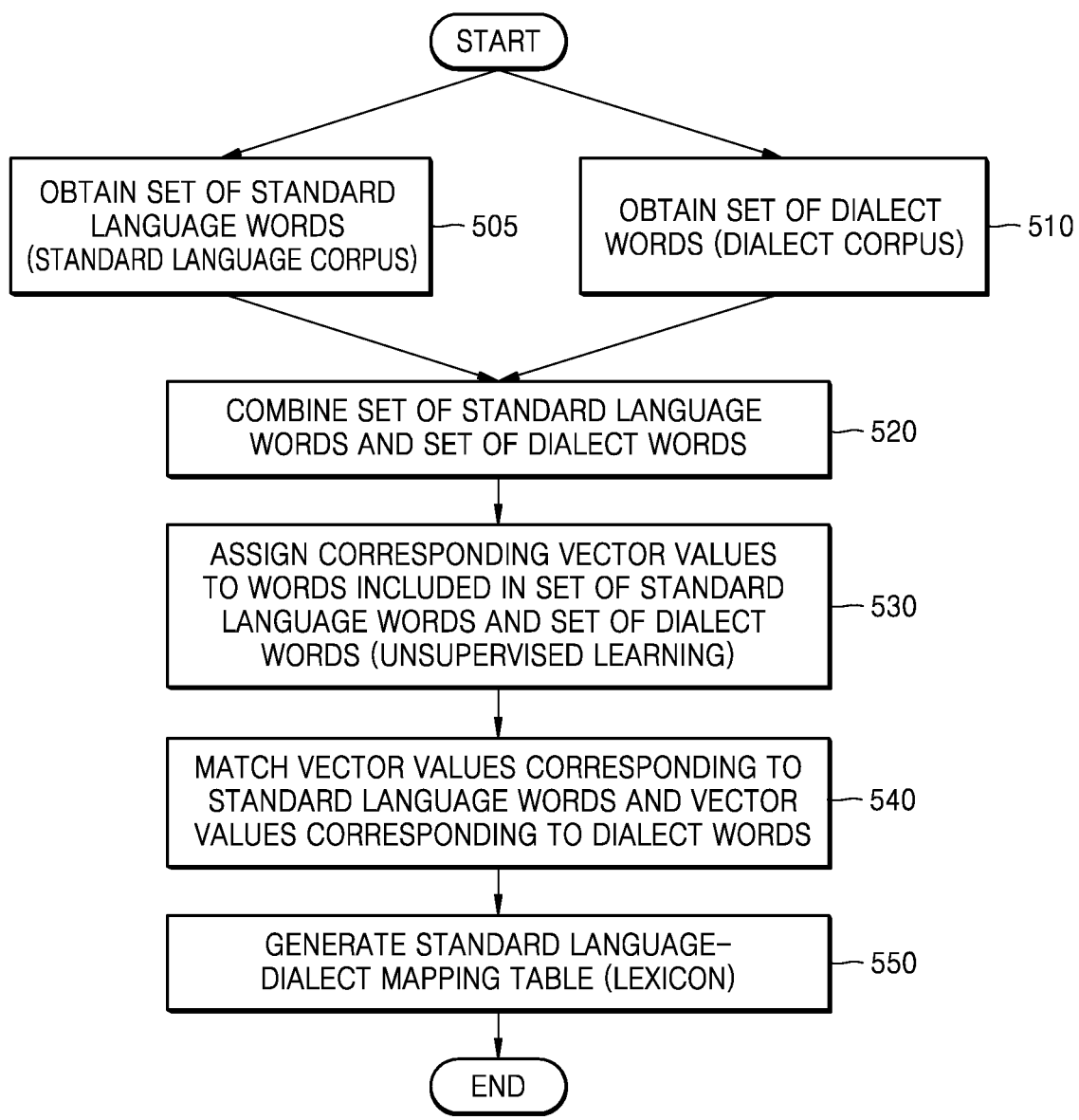
FIG. 5 is a detailed flowchart of a method of generating a standardized-dialect mapping table (lexicon), according to some embodiments.

FIG. 5 illustrates operations of a method of generating a standardized-dialect mapping table (lexicon) according to some embodiments.

Referring to the non-limiting example of FIG. 5, in operation 505, a device may obtain a set of standard language words (standard language corpus). Further, in operation 510, the device may obtain a set of dialect words (dialect corpus). As used herein, the term corpus encompasses a set of extracted samples of a language that is a target of machine translation.

In some embodiments, at operation 520, the device may combine the set of standard language words and the set of dialect words. Standard languages and dialects frequently have considerable similarities to each other, such as using the same alphabet, unlike different languages. For example, the device may extract common words that are used analogously in standard languages and dialects from the set of standard language words and the set of dialect words.

The device may, in some embodiments, generate a single corpus based on a relationship between the extracted common words and words included in the set of standard language words and the set of dialect words. The device may obtain a single common set by combining the set of standard language words and the set of dialect words with respect to the common words used in the standard languages and the dialects.

In operation 530, the device may assign corresponding vector values to the words included in the set of standard language words and the set of dialect words. Since the set of standard language words and the set of dialect words are combined into the common set, the vector values corresponding to the words included in the set of standard language words and the set of dialect words may be projected on the same ultra high dimensional space. The vector value may mean that information of each of the words included in the set of standard languages and the set of dialect words is represented by an n-dimensional (n is an arbitrary natural number) real number vector.

The information of each of the words may include information such as word, phrase, word order, and context information. Also, the information of each of the words may include not only information about the corresponding word but also information about synonyms, antonyms of the corresponding word, a corresponding standard language word, and/or a corresponding dialect word.

According to certain embodiments, a process of assigning corresponding vector values to words may be performed through unsupervised learning using an artificial neural network. In some embodiments, unsupervised learning encompasses machine learning that does not require an input of a supervised signal (correct answer).

Also, the device may assign the corresponding vector values to the words included in the set of standard language words and the set of dialect words by using an n-gram scheme. For example, the device may assign the corresponding vector values to the words included in the set of standard language words and the set of dialect words by stochastically expressing a chain of n words.

In various embodiments according to this disclosure, at operation 540, the device may match the vector values corresponding to standard language words and the vector values corresponding to the dialect words. The device may match the vector values assigned to the words included in the set of standard language words and the set of the dialect words in operation 530 based on the relationship between the words. For example, a specific dialect word may match with a corresponding standard language word, and may also match with synonyms, an antonym, etc. of the specific dialect word.

According to certain embodiments, at operation 550, the device may generate a standard language-dialect mapping table. The standard language-dialect mapping table may be analogous to the translation mapping table described with reference to FIG. 2. The standard language-dialect mapping table generated by the operations described with reference to FIG. 5 may be used to obtain one or more vector values corresponding to words included in a dialect sentence in the process of converting a dialect into a standard language.

In the foregoing description, a case has been described in which the device generates the standard language-dialect mapping table for convenience of description. According to certain embodiments, another device, such as a server or other device generates the standard language-dialect mapping table and the device uses the standard language-dialect mapping table generated by the server or the other device.

Figure 6:
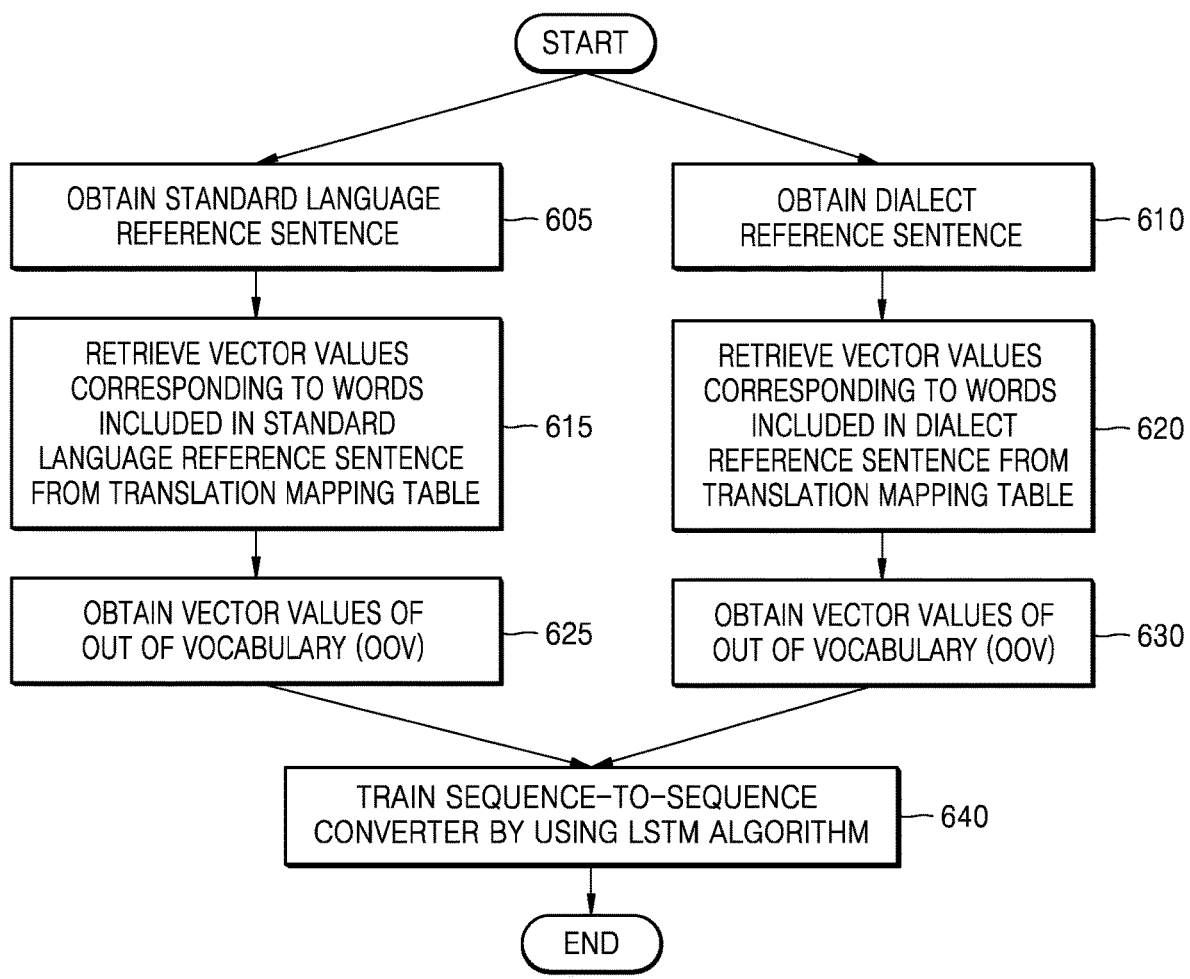
FIG. 6 illustrates operations of a method of training a sequence-to-sequence converter, according to some embodiments of this disclosure.

FIG. 6 illustrates operations of a method of training a sequence-to-sequence converter according to some embodiments.

Referring to the non-limiting example of FIG. 6, in operation 605, a device may obtain a standard language reference sentence. Also, in operation 610, the device may obtain a dialect reference sentence. A reference sentence may be a sentence that is input to train the sequence-to-sequence converter in a machine translation process using an artificial neural network.

In some embodiments, at operation 615, the device may retrieve vector values corresponding to words included in the standard language reference sentence from a translation mapping table. In operation 620, the device may retrieve vector values corresponding to words included in the dialect reference sentence from the translation mapping table. Since the translation mapping table of operations 615 and 620 is, in certain embodiments, analogous to the translation mapping table described with reference to FIG. 2, redundant descriptions thereof are omitted.

In operation 625, the device may obtain vector values of out of vocabulary (OOV) included in the standard language reference sentence. Also, in operation 630, the device may obtain vector values of words OOV included in the dialect reference sentence. The OOV may mean a word not included in a previously generated translation mapping table.

The device may, in certain embodiments, assign vector values corresponding to OOVs using an n-gram scheme. The device may predict a vector value corresponding to the word not included in the translation mapping table based on vector values corresponding to words having an arrangement of characters constituting the corresponding word and an arrangement of characters similar to the corresponding word. For example, the device may assign the vector values corresponding to the OOVs by stochastically representing a chain of n words.

The device may, in some embodiments, obtain corresponding vector values corresponding to all the words included in the standard language reference sentence and the dialect reference sentence through operations 625 and 630.

In operation 640, the device may train the sequence-to-sequence converter by using an LSTM algorithm. The device may train a relationship between an arrangement of vector values corresponding to the standard language reference sentence and an arrangement of vector values corresponding to the dialect reference sentence through the artificial neural network. By inputting pairs of numerous input sentences and output sentences into the artificial neural network, the device may derive the optimal weight for outputting a target sentence when a source sentence is input. Sequence-to-sequence trained through the foregoing process may be used in a translation process described with reference to FIGS. 2 and 3.

Although the foregoing description has been given for embodiments wherein the device trains the sequence-to-sequence converter, other embodiments are possible wherein another device, such as a server or other device trains the sequence-to-sequence converter, and the device uses the sequence-to-sequence converter trained by the server or the other device.

Figure 7:
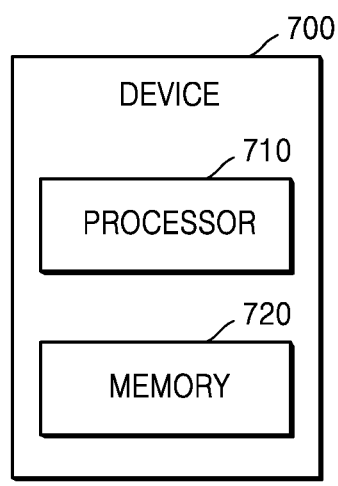
FIG. 7 illustrates, in block diagram format a device for performing translation, according to various embodiments of this disclosure.

FIG. 7 illustrates, in block diagram format, a device 700 for performing translation according to some embodiments of this disclosure.

The device 700 shown in the non-limiting example of FIG. 7 may time-serially process the methods shown in FIGS. 2 through 6. Thus, it will be understood that the above descriptions with respect to the methods of FIGS. 2 through 6 may be performed by the device 700 of FIG. 7, even if omitted below.

As shown in FIG. 7, the device 700 according to some embodiments may include a processor 710 and a memory 720. However, all the components shown in FIG. 7 are not indispensable components of the device 700. The device 700 may be implemented by systems comprising components beyond the components shown in FIG. 7, or the device 700 may be implemented by fewer components than those shown in FIG. 7.

For example, the device 700 may further include a user input (not shown) and a display (not shown) in addition to the processor 710 and the memory 720. The device 700 may receive a sentence including a dialect word from a user through the user input unit (not shown), and convert the received sentence into a standard language sentence. Also, the device 700 may display the converted standard language sentence on a screen through the display (not shown).

Also, the device 700 may be included in at least one of a home appliance, a mobile computing device, and a server, or may be connected to at least one of the home appliance, the mobile computing device, and the server by wired or wirelessly.

In some embodiments, processor 710 may be implemented by one or more processors. For example, the processor 710 may be implemented as an array of a plurality of logic gates, and may be implemented as a combination of a general purpose microprocessor and a memory in which a program executable in the microprocessor is stored.

The processor 710 may perform an overall role for controlling the device 700. For example, the processor 710 may generally control the device 700 by executing programs stored in the memory 720 included in the device 700. For example, the processor 710 may also perform functions of the device 700 described in FIGS. 2 through 6 by executing the programs stored in the memory 720.

Specifically, the processor 710 may obtain a sentence including a dialect word. The processor 710 may receive the sentence including the dialect word from the outside. The processor 710 may also extract the sentence including the dialect word from text included in data stored in the device 700 or generated by the device 700.

The processor 710 may, according to certain embodiments, detect a dialect of the sentence including the dialect word. For example, the processor 710 may receive a sentence and identify at least one dialect word among words included in the received sentence. The processor 710 may also determine a type of the dialect based on the identified at least one dialect word.

The processor 710 may determine a type of the most probable dialect among a plurality of dialects of a predetermined language based on an arrangement of characters constituting the dialect word. The processor 710 may calculate a probability that the dialect word corresponds to each of the plurality of dialects and determine the dialect having the highest probability as the type of the dialect corresponding to the dialect word.

According to certain embodiments, processor 710 may identify at least one common word that is used identically in the dialect and a standard language in the sentence including the dialect word. The processor 710 may identify the at least one common word in the sentence including the dialect word and determine the type of the identified at least one common word.

The processor 710 may replace the identified at least one common word with a predetermined keyword. For example, the processor 710 may replace all proper nouns with "PER". Also, the processor 710 may replace all organizations with "ORG", replace all numbers with "NUM", and replace all dates with "DATE". Predetermined keywords such as "PER", "TIME", "DATE", and "ORG" are merely examples and are not limited these examples.

Meanwhile, the processor 710 may store in the memory 720 information mapping the predetermined keyword, the at least one common word, and a position of the at least one common word in the sentence including the dialect word.

The processor 710 may obtain one or more vector values corresponding to the predetermined keyword and each of remaining words included in the sentence. The processor 710 may obtain a predetermined vector value of the predetermined keyword and obtain the vector values corresponding to the remaining words based on the predetermined vector value.

The processor 710 may also determine whether the predetermined keyword and the remaining words included in the sentence are included in a translation mapping table and when the predetermined keyword and a first word among the remaining words included in the sentence are included in the translation mapping table, and obtain a vector value corresponding to the first word from the translation mapping table.

According to certain embodiments, when the predetermined keyword and a second word among the remaining words included in the sentence are not included in the translation mapping table, the processor 710 may predict a vector value corresponding to the second word based on an arrangement of characters constituting the second word.

The processor 710 may obtain a vector value corresponding to a word by using an n-gram scheme, which is one of several representative probabilistic language models suitable for use in embodiments according to this disclosure. The processor 710 may probabilistically represent a chain of n words, thereby predicting information about words that are not stored in the translation mapping table.

The processor 710 may obtain a standard language sentence based on an arrangement of the obtained one or more vector values. The processor 710 may use a sequence-to-sequence conversion to convert an arrangement of vector values representing a dialect sentence into an arrangement of vector values representing the corresponding standard language sentence.

The processor 710 may obtain the one or more vector values corresponding to the predetermined keyword and each of the remaining words included in the sentence and obtain a converted sentence including standard language words corresponding to the remaining words and the predetermined keyword based on an arrangement of the obtained one or more vector values. Also, the processor 710 may convert the predetermined keyword included in the converted sentence into at least one common word, thereby obtaining a complete standard language sentence.

In some embodiments, as part of a process of converting the predetermined keyword included in the converted sentence into the at least one common word, the processor 710 use information mapping the predetermined keyword, the at least one common word, and a position of the at least one common word in the sentence including the dialect word that are stored in the memory 720.

Meanwhile, the processor 710 may obtain a set of standard language words and a set of dialect words. The processor 710 may extract common words that are used equally in the set of standard language words and the set of dialect words, and may assign a first vector value to the extracted common words.

The processor 710 may assign second vector values corresponding to respectively words included in the set of standard language words based on the assigned first vector value and an arrangement of characters constituting each of the words included in the set of standard language words. Also, the processor 710 may assign third vector values corresponding to respectively words included in the set of standard language words based on the assigned first vector value and an arrangement of characters constituting each of the words included in the set of dialect words.

The processor 710 may generate a translation mapping table by matching the second vector values and the third vector values. The processor 710 may continue to train and update the generated translation mapping table. For example, the processor 710 may obtain a set of new standard language words and a set of dialect words, and repeat the process described above.

The memory 720 is, in certain embodiments, hardware which stores various types of data processed in the device 700. For example, the memory 720 may store a program code for processing and control of the processor 710, and may store data input to or output from the device 700. For example, the memory 720 may also store user data. For example, the memory 720 may store the translation mapping table generated according to the method described with reference to the non-limiting example of FIG. 5, and may store training results of a sequence-to-sequence converter trained according to the method described with reference to FIG. 6.

The memory 720 may include at least one type of storage medium among a flash memory type, a hard disk type, a multimedia card micro type, a card type memory (e.g., SD or XD memory), a RAM (Random Access Memory) SRAM (Static Random Access Memory), ROM (Read Only Memory), EEPROM (Electrically Erasable Programmable Read-Only Memory), PROM (Programmable Read-Only Memory), a magnetic memory, a magnetic disc, and an optical disc.

The programs stored in the memory 720 may be classified into a plurality of modules according to their functions, for example, a dialect detector, an NER, a sequence-to-sequence converter, etc.

On the other hand, the operation method of the device 700 may be recorded in a non-transitory computer-readable recording medium having recorded thereon one or more programs including instructions for executing the method. Examples of the non-transitory computer readable recording medium include magnetic media such as a hard disk, a floppy disk and a magnetic tape, optical media such as CD-ROM and DVD, a floppy disk, and hardware devices specifically configured to store and execute program instructions such as ROM, RAM, flash memory, and the like. Examples of program instructions include machine language code such as those produced by a compiler, as well as high-level programming language that may be executed by a computer using an interpreter or the like.

It should be understood that embodiments described herein are illustrative, rather than limitative of the scope of the present disclosure. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of converting a dialect of a predetermined language into a standard language, the method comprising:
   obtaining, by at least one processor of an apparatus, a sentence including a dialect word;
   identifying, by the at least one processor, at least one common word that is used in identical form and identical meaning in the dialect and the standard language in the sentence including the dialect word;

replacing, by the at least one processor, the identified at least one common word with a predetermined keyword corresponding to an object type of the identified at least one common word to create a dialect hybrid sentence including both the dialect word and the predetermined keyword;

storing, on a memory of the apparatus, mapping information of the predetermined keyword including information mapping the predetermined keyword, the at least one common word, and a position of the at least one common word in the sentence;

obtaining, by the at least one processor, a predetermined vector value corresponding to the predetermined keyword;

obtaining, by the at least one processor, vector values corresponding to remaining words included in the dialect hybrid sentence based on the predetermined vector value;

obtaining, by the at least one processor, a standard language sentence based on an arrangement of vector values that corresponds to the dialect hybrid sentence and includes the obtained predetermined vector value and the vector values corresponding to the remaining words, wherein obtaining the standard language sentence comprises:

obtaining, by the at least one processor, a converted sentence including standard language words corresponding to the remaining words and the predetermined keyword based on the arrangement of the vector values that corresponds to the dialect hybrid sentence, identifying, by the at least one processor, the predetermined keyword in the converted sentence using the mapping information stored to the memory, and converting, by the at least one processor, the predetermined keyword included in the converted sentence into the at least one common word again; and displaying, on a display of the apparatus, the standard language sentence.

2. The method of claim 1, wherein the at least one common word includes a proper noun including a name of a person, a name of a place, and a name of an organization.

3. The method of claim 1, wherein the obtaining of the sentence including the dialect word comprises:
receiving a sentence;
identifying at least one dialect word among words included in the received sentence; and
determining a type of the dialect based on the identified at least one dialect word.

4. The method of claim 1, wherein the obtaining of the vector values corresponding to the remaining words comprises:
determining whether the predetermined keyword and the remaining words included in the dialect hybrid sentence are included in a translation mapping table; and
when the predetermined keyword and a first word among the remaining words included in the dialect hybrid sentence are included in the translation mapping table, obtaining a vector value corresponding to the first word from the translation mapping table.

5. The method of claim 4, wherein the obtaining of the vector values corresponding to the remaining words comprises:
when the predetermined keyword and a second word among the remaining words included in the dialect hybrid sentence are not included in the translation mapping table, predicting a vector value corresponding to the second word based on an arrangement of characters constituting the second word.

6. The method of claim 4, further comprising:
obtaining a set of standard language words and a set of dialect words;
extracting common words used in the standard language and the dialect from the set of standard language words and the set of dialect words;
assigning a first vector value to the extracted common words;
assigning second vector values corresponding to each of words included in the set of standard language words based on the assigned first vector value and an arrangement of characters constituting each of the words included in the set of standard language words;
assigning third vector values corresponding to each of words included in the set of dialect words based on the assigned first vector value and an arrangement of characters constituting each of the words included in the set of dialect words; and
generating the translation mapping table by matching the second vector values and the third vector values.

7. The method of claim 1, wherein the sentence including the dialect word includes a change in at least one of a word, an order of words, a length of a sentence, a prefix, and a suffix in comparison with the standard language sentence.

8. An apparatus comprising:
a display;
a memory in which at least one program is stored; and
at least one processor configured to convert a dialect of a predetermined language into a standard language by executing the at least one program,
wherein the at least one program comprises instructions for:
obtaining a sentence including a dialect word;
identifying at least one common word that is used in identical form and identical meaning in the dialect and the standard language in the sentence including the dialect word;
replacing the identified at least one common word with a predetermined keyword with a predetermined keyword corresponding to an object type of the identified at least one common word to create a dialect hybrid sentence including both the dialect word and the predetermined keyword;
storing mapping information of the predetermined keyword including information mapping the predetermined keyword, the at least one common word, and a position of the at least one common word in the sentence;
obtaining a predetermined vector value corresponding to the predetermined keyword;
obtaining vector values corresponding to remaining words included in the dialect hybrid sentence based on the predetermined vector value;
obtaining a standard language sentence based on an arrangement of vector values that corresponds to the dialect hybrid sentence and includes the obtained predetermined vector value and the vector values corresponding to the remaining words, wherein obtaining the standard language sentence comprises:
obtaining a converted sentence including standard language words corresponding to the remaining words and the predetermined keyword based on the arrangement of the vector values that corresponds to the dialect hybrid sentence, identifying the predetermined keyword in the converted sentence using the mapping information stored to the memory, and converting the predetermined keyword included in the converted sentence into the at least one common word again; and controlling the display to display the standard language sentence.

9. The apparatus of claim 8, wherein the at least one common word includes a proper noun including a name of a person, a name of a place, and a name of an organization.

10. The apparatus of claim 8, wherein the obtaining of the sentence including the dialect word comprises:

receiving a sentence;

identifying at least one dialect word among words included in the received sentence; and determining a type of the dialect based on the identified at least one dialect word.

11. The apparatus of claim 8, wherein the obtaining of the vector values corresponding to the remaining words comprises:

determining whether the predetermined keyword and the remaining words included in the dialect hybrid sentence are included in a translation mapping table; and when the predetermined keyword and a first word among the remaining words included in the dialect hybrid sentence are included in the translation mapping table, obtaining a vector value corresponding to the first word from the translation mapping table.

12. The apparatus of claim 11, wherein the obtaining of the vector values corresponding to the remaining words comprises:

when the predetermined keyword and a second word among the remaining words included in the dialect hybrid sentence are not included in the translation mapping table, predicting a vector value corresponding to the second word based on an arrangement of characters constituting the second word.

13. The apparatus of claim 11, wherein the at least one program further comprises:

obtaining a set of standard language words and a set of dialect words;

extracting common words used in the standard language and the dialect from the set of standard language words and the set of dialect words;

assigning a first vector value to the extracted common words;

assigning second vector values corresponding to each of words included in the set of standard language words based on the assigned first vector value and an arrangement of characters constituting each of the words included in the set of standard language words;

assigning third vector values corresponding to each of words included in the set of dialect words based on the assigned first vector value and an arrangement of characters constituting each of the words included in the set of dialect words; and generating the translation mapping table by matching the second vector values and the third vector values.

* * * * *